(12) United States Patent
Zhang et al.

(10) Patent No.: US 9,553,490 B2
(45) Date of Patent: Jan. 24, 2017

(54) MOTOR

(71) Applicant: Nidec Corporation, Kyoto (JP)

(72) Inventors: Tiecheng Zhang, Dalian (CN); Peng Li, Dalian (CN); Dongxu Zhang, Dalian (CN); Yingping Sun, Dalian (CN)

(73) Assignee: Nidec Corporation, Kyoto (JP)

(*) Notice: Subject to any disclaimer, the term of this patent is extended or adjusted under 35 U.S.C. 154(b) by 218 days.

(21) Appl. No.: 14/548,444

(22) Filed: Nov. 20, 2014

(65) Prior Publication Data

US 2015/0171696 A1 Jun. 18, 2015

(30) Foreign Application Priority Data

Dec. 12, 2013 (CN) .......................... 2013 1 0681206

(51) Int. Cl.
*H02K 5/04* (2006.01)
*H02K 1/27* (2006.01)
*H02K 11/00* (2016.01)
*H02K 5/16* (2006.01)

(52) U.S. Cl.
CPC .............. *H02K 5/163* (2013.01); *H02K 11/33* (2016.01)

(58) Field of Classification Search
CPC ..... H02K 11/00; H02K 11/0015; H02K 11/33; H02K 1/2786; H02K 5/04; H02K 5/163

USPC ........................................ 310/68 B, 68 R, 91
See application file for complete search history.

(56) References Cited

U.S. PATENT DOCUMENTS

| 2005/0134127 | A1 | 6/2005 | Nomura | |
|---|---|---|---|---|
| 2012/0043862 | A1* | 2/2012 | Furukawa | H02K 1/278 310/68 B |
| 2013/0171015 | A1* | 7/2013 | Oguma | F04D 25/06 417/423.7 |

FOREIGN PATENT DOCUMENTS

CN          1630162 A        6/2005

\* cited by examiner

*Primary Examiner* — Alex W Mok
(74) *Attorney, Agent, or Firm* — Keating & Bennett, LLP

(57) ABSTRACT

A motor includes a rotary and a stationary portion. The rotary portion includes a shaft, a rotor holder, and a rotor magnet. The stationary portion includes a bearing member, a housing, a stator, a circuit board directly or indirectly held in the housing, positioned axially below the rotor holder, and a circuit board support portion provided together with the housing as a monolithic member or directly or indirectly held in the housing, directly or indirectly attached to a device body. The circuit board includes first and second circuit boards positioned respectively axially above and below the circuit board support portion. The first and second circuit boards are electrically connected via a connecting member, and partially overlap. An attachment portion attaching the motor to a device is positioned on an outer peripheral surface of the circuit board support portion.

12 Claims, 5 Drawing Sheets

MOTOR

BACKGROUND OF THE INVENTION

1. Field of the Invention

The present invention relates to a motor mounted to a so-called handy (i.e., hand-operated) electronic product such as a hair curler or the like which is held by and used with the hand of a user.

2. Description of the Related Art

In recent years, a motor has been required to be made smaller as household electronic products become smaller in size.

A motor mounted to a handy electronic product such as a small-sized hair curler or the like is often installed within a portion of a main body held with the hand of a user or disposed within a flow path of a fluid. Accordingly, a reduction in the outer diameter of a motor is directly associated with a reduction in the weight and size of a handy electronic product such as a hair curler or the like. For that reason, the motor is required to be made smaller in size.

In addition to the miniaturization of a circuit board resulting from the reduction in the size of the motor, an attachment portion for attaching the motor to a main body of an electronic product overlaps with a portion of a circuit board mounting space. This poses a problem in that the circuit board mounting space becomes narrow and deficient.

SUMMARY OF THE INVENTION

In one illustrative preferred embodiment of the present invention, a motor includes a rotary portion arranged to rotate about a center axis extending in an up-down direction; and a stationary portion configured to support the rotary portion, wherein the rotary portion includes a shaft extending along the center axis, a rotor holder configured to rotate together with the shaft and a rotor magnet held in the rotor holder, the stationary portion includes a bearing member configured to rotatably support the shaft, a housing configured to hold the bearing member, a stator held in the housing and radially opposed to the rotor magnet, a circuit board directly or indirectly held in the housing, positioned axially below the rotor holder, and electrically connected to the stator, and a circuit board support portion defined together with the housing as a single monolithic member, or directly or indirectly held in the housing, directly or indirectly attached to a device body and configured to axially support the circuit board, the circuit board includes a first circuit board positioned axially above the circuit board support portion and a second circuit board positioned axially below the circuit board support portion, the first circuit board and the second circuit board are electrically connected to each other via a connecting member, the first circuit board and the second circuit board at least partially overlap with each other in an axial direction, and an attachment portion configured to attach the motor to a device is positioned on an outer peripheral surface of the circuit board support portion.

According to one illustrative preferred embodiment of the present invention, it is possible to realize a reduction in the size of the motor and to secure a circuit board mounting space.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A first preferred embodiment of the present invention will now be described with reference to the accompanying drawings which form a portion of this disclosure. In the following description, the direction parallel or substantially parallel to a center axis of a motor will be referred to as an "axial direction". The direction perpendicular or substantially perpendicular to the center axis of the motor will be referred to as a "radial direction". The direction extending along an arc centered at the center axis of the motor will be referred to as a "circumferential direction". In the subject application, the shape and positional relationship of the respective portions will be described by defining the axial direction as an up-down direction and by defining the side of a rotor holder with respect to a circuit board support portion as an upper side. However, the definition of the up-down direction is not intended to limit the in-manufacture or in-use direction of the motor according to the present invention. In the following description, the shape and positional relationship of the respective portions will be described by defining the radial direction as an inside-outside direction and by defining the side of a stator with respect to a shaft as an outside. However, the definition of the inside-outside direction is not intended to limit the in-manufacture or in-use direction of the motor according to various preferred embodiments of the present invention.

Figure 1:
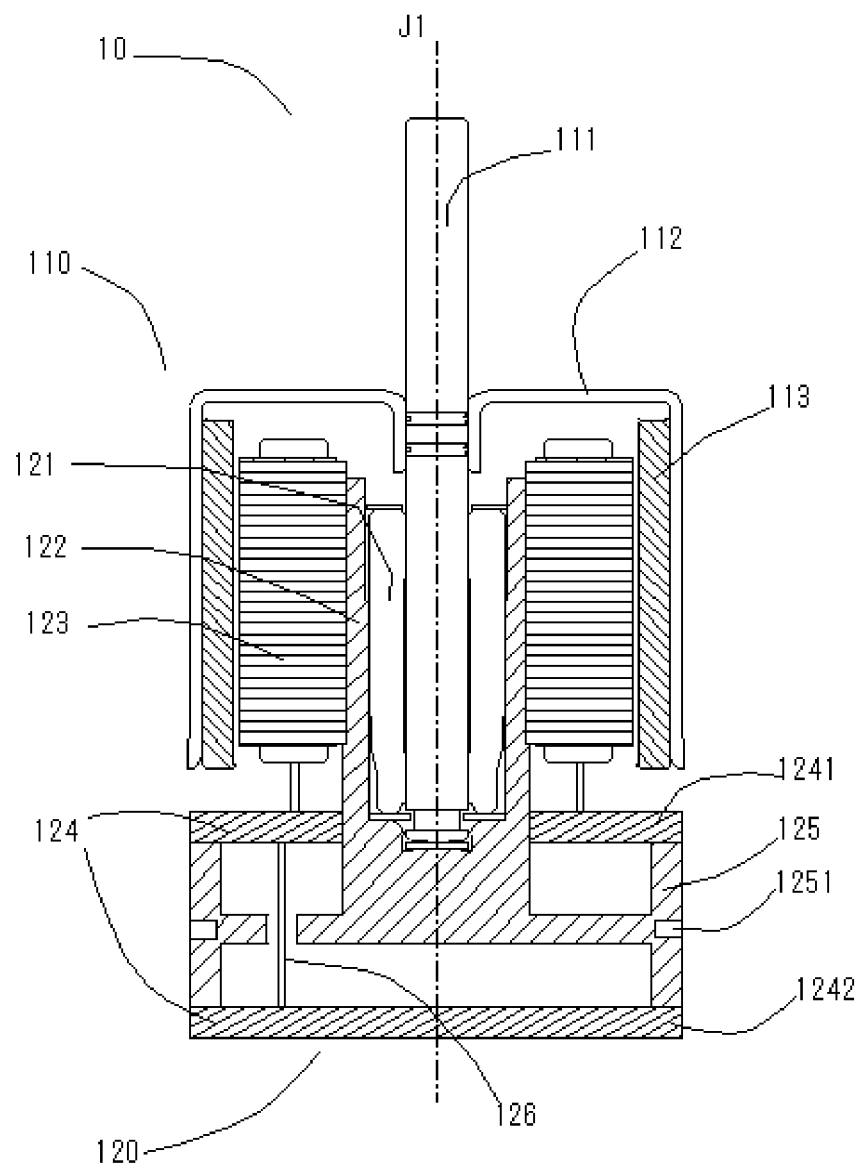
FIG. 1 is a sectional view of a motor according to a first preferred embodiment of the present invention.

FIG. 1 is a sectional view of a motor according to a first preferred embodiment of the present invention. As shown in FIG. 1, the motor of the present invention is preferably an outer-rotor-type motor 10. The outer-rotor-type motor 10 preferably includes a rotary portion 110 configured to rotate about a center axis J1 extending in the up-down direction and a stationary portion 120 configured to rotatably support the rotary portion 110. The rotary portion 110 preferably includes a shaft 111 extending along the center axis J1, a rotor holder 112 configured to rotate together with the shaft 111, and a rotor magnet 113 held in the rotor holder 112. The stationary portion 120 preferably includes a bearing member 121 configured to rotatably support the shaft 111, a housing 122 configured to hold the bearing member 121, a stator 123 held in the housing 122, and radially opposed to the rotor magnet 113, a circuit board 124 directly or indirectly held in the housing 122, positioned axially below the rotor holder 112 and electrically connected to the stator 123, and a circuit board support portion 125 defined together with the housing 122 as a single monolithic member, or directly or indirectly held in the housing 122, directly or indirectly attached to a device body and configured to axially support the circuit board 124. The circuit board 124 preferably includes a first circuit board 1241 positioned axially above the circuit board support portion 125 and a second circuit board 1242 positioned axially below the circuit board support portion 125. The first circuit board 1241 and the second circuit board 1242 are preferably electrically connected to each other via a connecting member 126. The first circuit board 1241 and the second circuit board 1242 axially overlap with each other. Attachment portions 1251 configured to attach the motor 10 to a device (such as a handy device as described above) are preferably positioned on the outer circumferential surface of the circuit board support portion 125.

More specifically, as shown in FIG. 1, the rotor holder 112 preferably includes a cylindrical fixing portion fixed to the shaft 111, a disc-shaped cover portion extending radially outward from the fixing portion and a cylinder portion extending downward from a radial outer end of the cover portion. The rotor magnet 113 is preferably fixed to the inner circumferential surface of the cylinder portion of the rotor holder 112 by, e.g., an adhesive agent. The stator 123 is positioned radially inward of the rotor magnet 113 and is radially opposed to the rotor magnet 113. The stator 123 preferably includes a stator core around which a coil formed of a copper wire or an aluminum wire is wound. By the coil being electrically connected to the circuit board 124, the stator 123 is electrically connected to the circuit board 124. Due to the coil being electrically connected to the first circuit board 1241, the stator 123 generates magnetic fields. Thus, the stator 123 generates a torque between itself and the rotor magnet 113.

The circuit board 124 preferably includes a first circuit board 1241 positioned axially above the circuit board support portion 125 and a second circuit board 1242 positioned axially below the circuit board support portion 125. A land portion is preferably arranged on the axial upper surface of the first circuit board 1241 and the coil is soldered to the land portion. A rotation detecting element, e.g., a Hall element, is preferably mounted to the first circuit board 1241. The first circuit board 1241 is positioned adjacent to and axially opposed to the rotor magnet 113. Thus, if the rotation detecting element is of a magnetic type, it is possible for the rotation detecting element to easily detect magnetic flux of the rotor magnet 113.

In the present preferred embodiment, the circuit board support portion 125 and the housing 122 are preferably defined together as a single monolithic member. That is to say, the housing 122 extends axially downward from the portion that holds the bearing member 121, thus defining the circuit board support portion 125. The circuit board support portion 125 preferably is disc-shaped or substantially disc-shaped and extends radially outward. The circuit board support portion 125 protrudes axially upward and downward in the radial outer region thereof and preferably has an H-shaped cross section. The circuit board support portion 125 is configured to support the first circuit board 1241 in the region protruding axially upward. Furthermore, the circuit board support portion 125 is configured to support the second circuit board 1242 in the region protruding axially downward.

Figure 2:
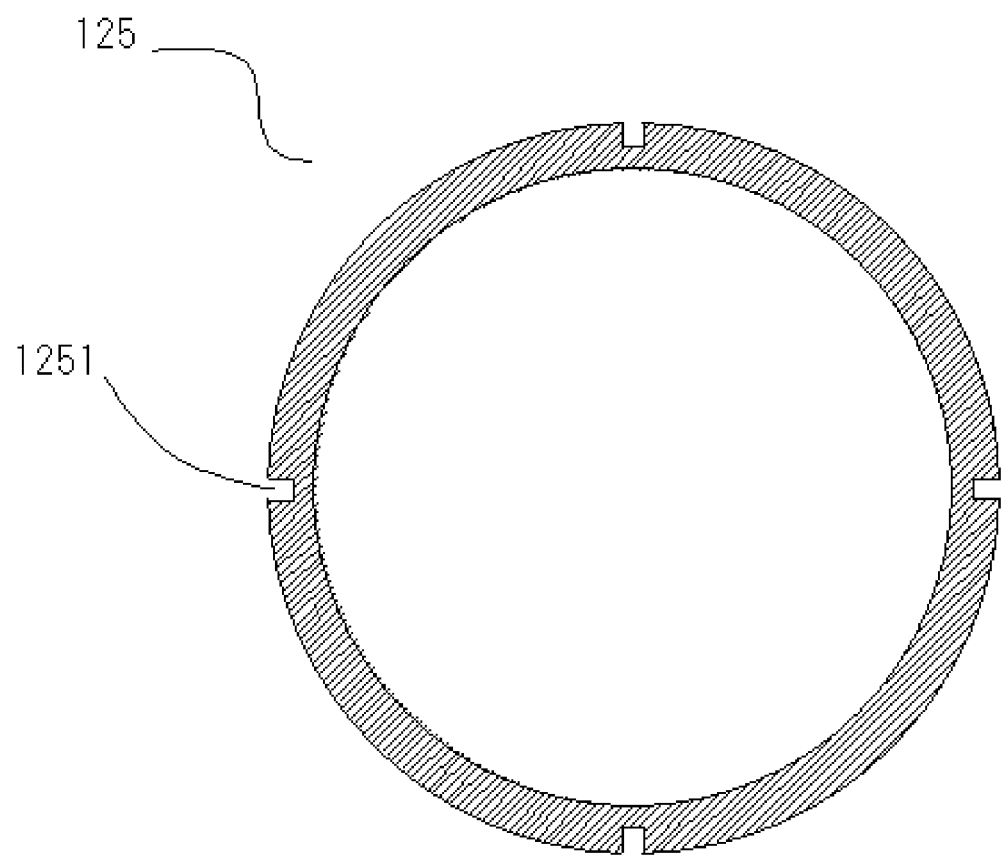
FIG. 2 is a plane view of a circuit board holding portion of the motor according to the first preferred embodiment of the present invention.

FIG. 2 is a plane view of the circuit board support portion 125. As shown in FIG. 2, a plurality of attachment portions 1251 is preferably disposed along the circumferential direction of the circuit board support portion 125. Preferably, the attachment portions 1251 are arranged at a regular or substantially regular interval along the circumferential direction. More preferably, the attachment portions 1251 are three or more, for example.

Preferably, as shown in FIG. 2, the attachment portions 1251 include recess portions depressed radially inward from the outer circumferential surface of the circuit board support portion 125. When mounting the motor to a device body, the attachment portions 1251 are fixed by inserting fixing members into the recess portions from radially outer sides thereof. The fixing members may be insertion members such as, for example, screws or the like.

Figure 3:
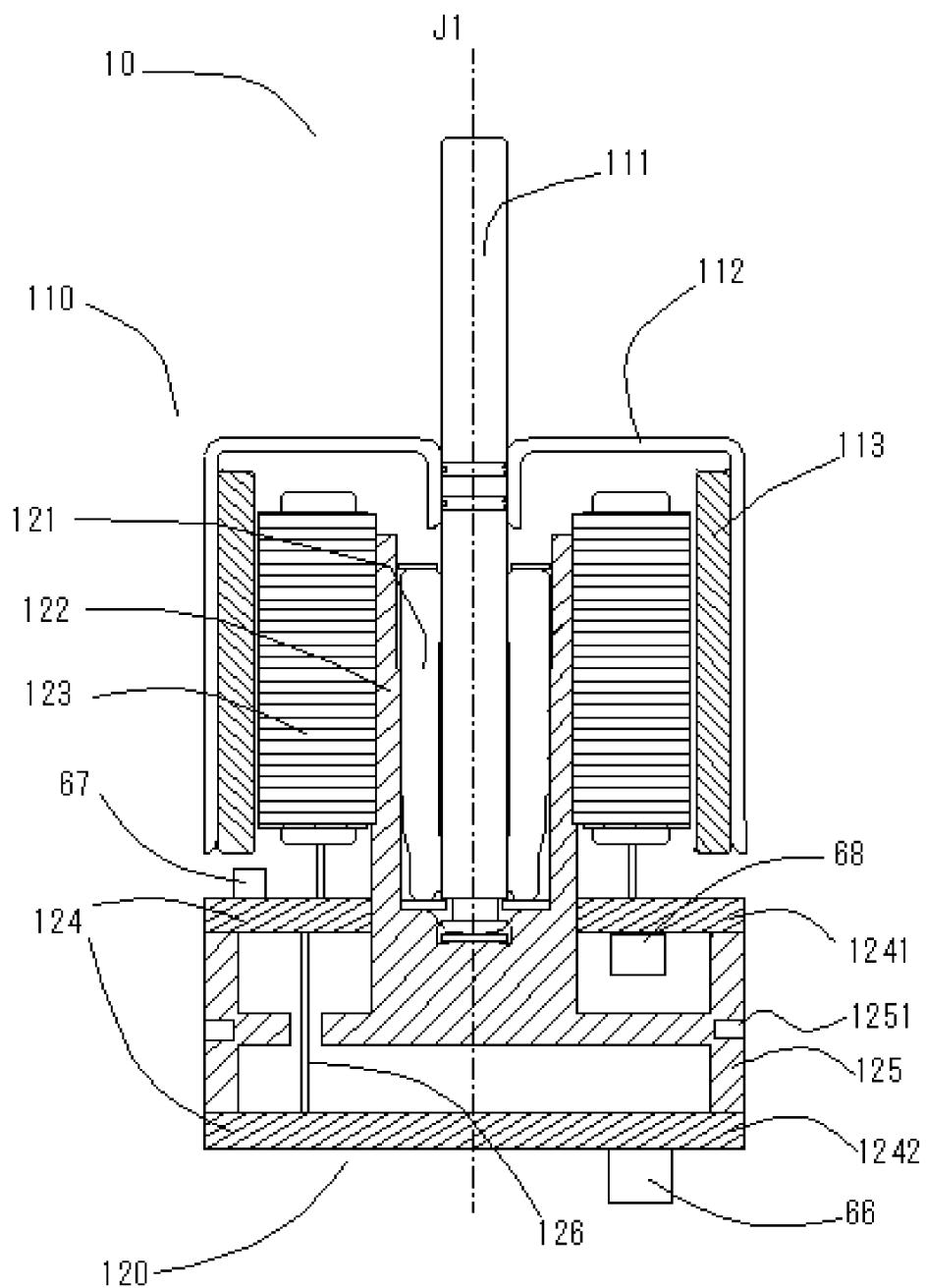
FIG. 3 is a sectional view of a modified example of the motor according to the first preferred embodiment of the present invention.

FIG. 3 is a sectional view of a modified example of the motor according to the first preferred embodiment of the present invention. The structures identical with those of the first preferred embodiment shown in FIG. 1 will not be described and only the differing portions will be described.

As shown in FIG. 3, electronic parts 66 are mounted to the axial lower surface of the second circuit board 1242. The electronic parts 66 are preferably electronic parts having a large size such as, for example, a control IC and the like, or electronic parts that generate a large amount of heat. For example, the electronic parts 66 may be a power-supply control IC, a DC-DC converter, etc.

Preferably, as shown in FIG. 3, a rotation position detecting member 67 is mounted to the axial upper surface of the first circuit board 1241. The rotation position detecting member 67 is a magnetic detection member such as, for example, a Hall element or a Hall IC. The rotation position detecting member 67 is disposed adjacent to the rotor magnet 113. By detecting the magnetic fields of the rotor magnet 113, the rotation position detecting member 67 detects the rotation position of the rotary portion 110.

Preferably, as shown in FIG. 3, electronic parts 68 having a small size such as, for example, a resistor, a capacitor and the like are mounted to the first circuit board 1241 and the second circuit board 1242. These electronic parts 68 are positioned in a space defined between the first circuit board 1241 and the second circuit board 1242.

Preferably, the circuit board support portion 125 is made of an insulating material such as, for example, a resin or the like.

Preferably, the circuit board support portion 125 has a disc shape.

Preferably, the second circuit board 1242 partially overlaps with the shaft 111 in the axial direction.

Preferably, the shaft 111 protrudes axially upward from the top end of the rotor holder 112.

Figure 4:
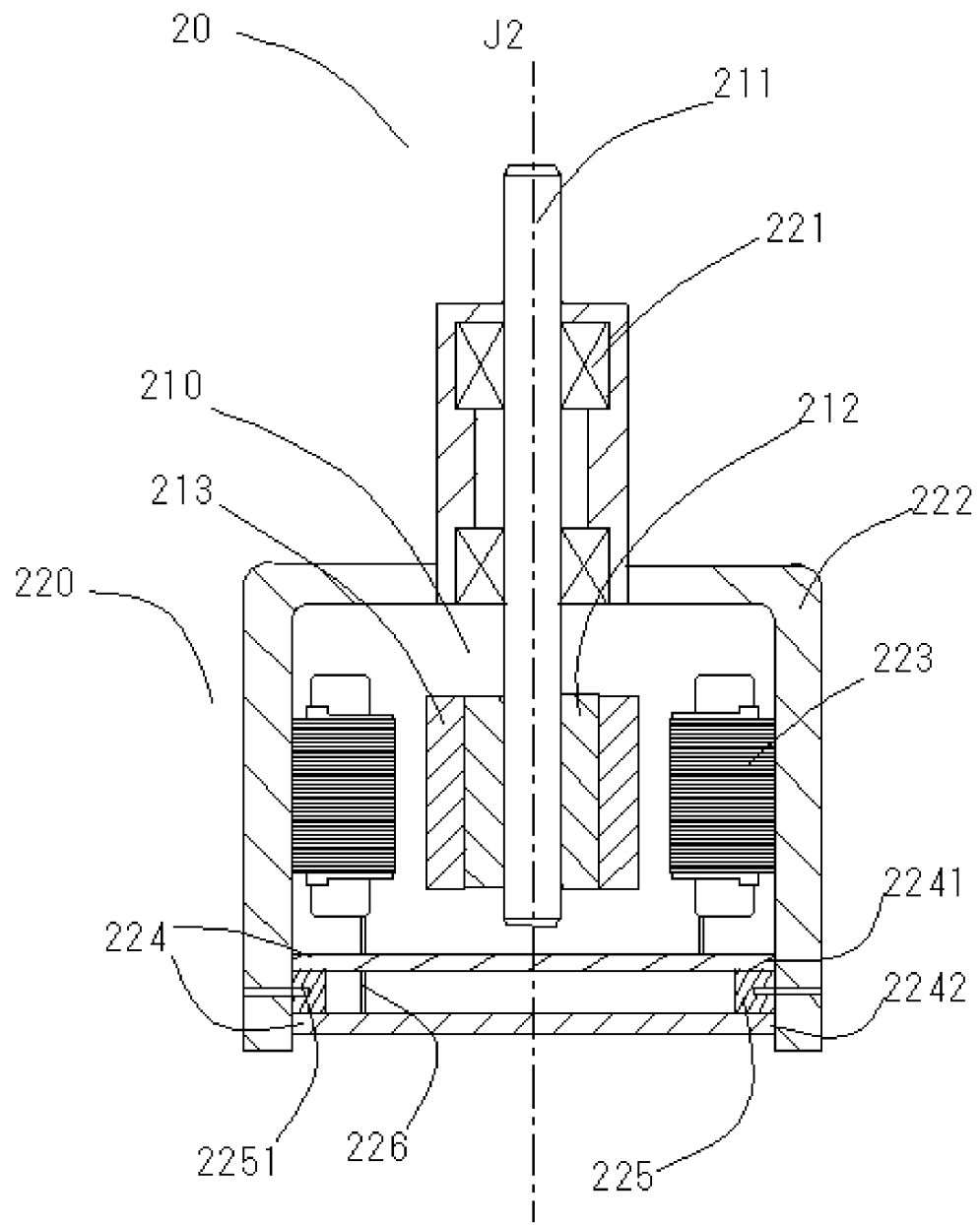
FIG. 4 is a sectional view of a motor according to a second preferred embodiment of the present invention.

FIG. 4 is a sectional view of a motor according to a second preferred embodiment of the present invention. As shown in FIG. 4, the motor of the second preferred embodiment is preferably an inner-rotor-type motor 20. The inner-rotor-type motor 20 preferably includes a rotary portion 210 configured to rotate about a center axis J2 extending in the up-down direction and a stationary portion 220 configured to support the rotary portion 210. The rotary portion 210 preferably includes a shaft 211 extending along the center axis J2, a magnet holder 212 configured to rotate together with the shaft 211, and a rotor magnet 213 held in the magnet holder 212. The stationary portion 220 preferably includes a bearing member 221 configured to rotatably support the shaft 211, a housing 222 configured to hold the bearing member 221, and a stator 223 held in the housing 222 and radially opposed to the rotor magnet 213. The stationary portion 220 preferably further includes a circuit board 224 directly or indirectly held in the housing 222, positioned axially below the magnet holder 212 and electrically connected to the stator 223, and a circuit board support portion 225 defined together with the housing 222 as a single monolithic member or directly or indirectly held in the housing 222, directly or indirectly attached to a device body and configured to axially support the circuit board 224. The circuit board 224 preferably includes a first circuit board 2241 positioned axially above the circuit board support portion 225 and a second circuit board 2242 positioned axially below the circuit board support portion 225. The first circuit board 2241 and the second circuit board 2242 are preferably electrically connected to each other via a connecting member 226. The first circuit board 2241 and the second circuit board 2242 axially overlap with each other. Attachment portions 2251 configured to attach the motor to a device are positioned on the outer circumferential surface of the circuit board support portion 225.

More specifically, as shown in FIG. 4, the magnet holder 212 preferably includes a cylinder portion. The rotor magnet 213 is preferably fixed to the outer circumferential surface of the cylinder portion of the magnet holder 212 by, e.g., an adhesive agent. The stator 223 is positioned radially outward of the rotor magnet 213 and is radially opposed to the rotor magnet 213. A coil formed of, e.g., a copper wire or an aluminum wire, is preferably wound around the stator 223. By the coil being electrically connected to the circuit board 224, the stator 223 is electrically connected to circuit board 224. Preferably, the coil is electrically connected to the first circuit board 2241.

Figure 5:
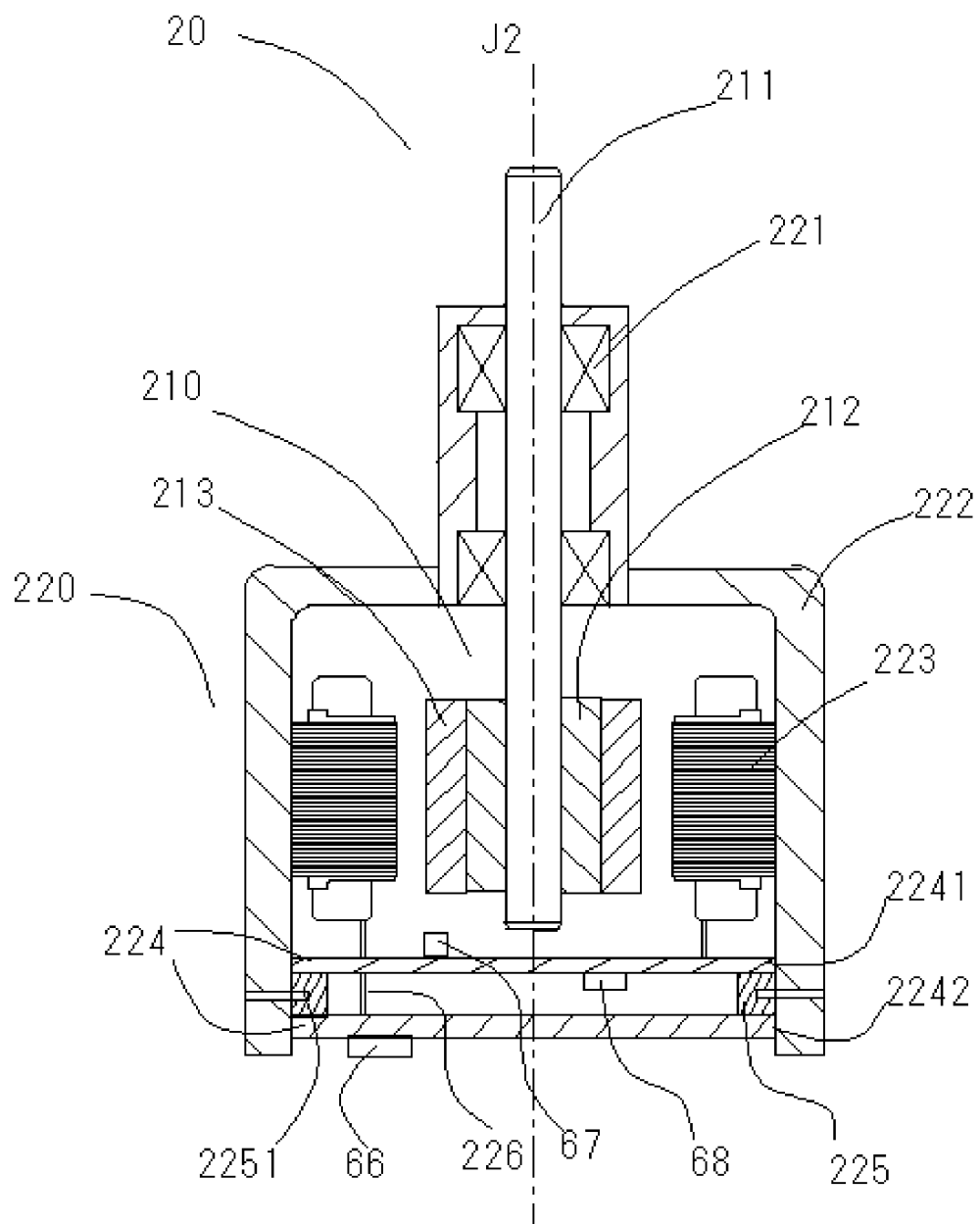
FIG. 5 is a sectional view of a modified example of the motor according to the second preferred embodiment of the present invention.

FIG. 5 is a sectional view of a modified example of the motor according to the second preferred embodiment of the present invention. Other structures of the second preferred embodiment of the present invention preferably are the same as those of the first preferred embodiment and, therefore, will not be described here.

As shown in FIG. 1, the motor according to the first preferred embodiment of the present invention is an outer-rotor-type motor 10. The outer-rotor-type motor 10 preferably includes a rotary portion 110 configured to rotate about a center axis J1 extending in the up-down direction and a stationary portion 120 configured to support the rotary portion 110. The rotary portion 110 preferably includes a shaft 111 extending along the center axis J1, a rotor holder 112 configured to rotate together with the shaft 111, and a rotor magnet 113 held in the rotor holder 112. The stationary portion 120 preferably includes a bearing member 121 configured to rotatably support the shaft 111, a housing 122 configured to hold the bearing member 121, a stator 123 held in the housing 122 and radially opposed to the rotor magnet 113, a circuit board 124 directly or indirectly held in the housing 122, positioned axially below the rotor holder 112 and electrically connected to the stator 123, and a circuit board support portion 125 provided together with the housing 122 as a single monolithic member or directly or indirectly held in the housing 122, directly or indirectly attached to a device body, and configured to axially support the circuit board 124. The circuit board 124 preferably includes a first circuit board 1241 positioned axially above the circuit board support portion 125 and a second circuit board 1242 positioned axially below the circuit board support portion 125. The first circuit board 1241 and the second circuit board 1242 are preferably electrically connected to each other via a connecting member 126. The first circuit board 1241 and the second circuit board 1242 axially overlap with each other. Attachment portions 1251 configured to attach the motor to a device are positioned on the outer circumferential surface of the circuit board support portion 125.

More specifically, as shown in FIG. 1, the rotor holder 112 preferably includes a cylinder portion. The rotor magnet 113 is preferably fixed to the inner circumferential surface of the cylinder portion of the rotor holder 112 by, e.g., an adhesive agent. The stator 123 is positioned radially inward of the rotor magnet 113 and is radially opposed to the rotor magnet 113. A coil preferably formed of a copper wire or an aluminum wire is wound around the stator 123. By the coil being electrically connected to the circuit board 124, the stator 123 is electrically connected to the circuit board 124. Preferably, the coil is electrically connected to the first circuit board 1241.

In various preferred embodiments of the present invention, the circuit board 124 preferably is configured by the first circuit board 1241 and the second circuit board 1242. It is therefore possible to increase the mounting space of the circuit board 124 without increasing the radial size of the motor. Since the attachment portions 1251 are provided on the outer circumferential surface of the circuit board support portion 125, there is no interference with the circuit board 124 when the motor is mounted to a device body. Thus, the motor mounting process becomes easy to perform. It is also possible to secure the mounting surface of the circuit board 124.

As shown in FIG. 3, the motor according to the first preferred embodiment of the present invention preferably includes the circuit board support portion 125. The circuit board support portion 125 preferably includes a plurality of attachment portions 1251. Therefore, when the motor is mounted to a device body, it is possible to reliably mount the motor to the device body. The attachment portions 1251 are evenly distributed along the circumferential direction. For that reason, the vibration generated in the motor is circumferentially evenly transferred to the device body through the attachment portions 1251. It is therefore possible to reduce the vibration shock received by the attachment portions 1251 and to prolong the lifespan of a product.

In the motor according to the first preferred embodiment of the present invention, the attachment portions 1251 preferably are defined by recess portions radially depressed from the outer circumferential surface of the circuit board support portion 125. It is therefore possible to easily form the attachment portions 1251. Moreover, the fixing members such as, for example, screws or the like can be inserted into the recess portions from the radial outer side. This makes it possible to easily mount the motor to a device body.

In the motor according to the first preferred embodiment of the present invention, as shown in FIG. 3, electronic parts 66 are mounted to the axial lower surface of the second circuit board 1242. The electronic parts 66 are electronic parts having a large size such as, for example, a control IC and the like or electronic parts that generate a large amount of heat. Since the electronic parts having a large size or the electronic parts that generate a large amount of heat are mounted to the axial lower surface of the second circuit board 1242, it is possible to secure the mounting space of the first circuit board 1241 and to improve the heat dissipation of the motor. Moreover, it is possible to prevent the electronic parts having a large size from interfering with the stator 123.

In the motor according to the first preferred embodiment of the present invention, as shown in FIG. 3, the magnetic detection member such as, for example, a Hall element or a Hall IC is mounted to the axial upper surface of the first circuit board 1241. Since the space can be saved as mentioned above, the mounting space for the magnetic detection member such as a Hall element or a Hall IC is not restricted. Accordingly, it is possible to use a Hall element or a Hall IC having a low accuracy. As a result, it is possible to save the production cost of the motor. In addition, since the Hall element or the Hall IC is capable of being disposed closer to the rotor magnet 113, it is possible to accurately detect the rotation position of the rotary portion 110.

In the motor according to the first preferred embodiment of the present invention, as shown in FIG. 3, electronic parts 68 having a small size and generating a small amount of heat, such as a resistor and a capacitor, are mounted to the mutually opposing surfaces of the first circuit board 1241 and the second circuit board 1242. These electronic parts 68 are positioned in the space existing between the first circuit board 1241 and the second circuit board 1242. With this structure, it is possible to use the space existing between the first circuit board 1241 and the second circuit board 1242. This makes it possible to further save the space of the motor.

In the motor according to the first preferred embodiment of the present invention, the circuit board support portion 125 is preferably made of an insulating material such as, for example, a resin or the like. This makes it possible to realize an inter-board insulation effect and to easily form the circuit board support portion 125. In addition, the outward appearance of the circuit board support portion 125 can be formed in many different shapes.

In the motor according to the first preferred embodiment of the present invention, the circuit board support portion 125 has a disc shape. Thus, the circuit board support portion 125 having a disc shape can be easily mounted to the motor.

In the motor according to the first preferred embodiment of the present invention, the second circuit board 1242 preferably partially overlaps with the shaft 111. Thus, a through-hole exposing the shaft 111 need not be formed in the second circuit board 1242. This makes it possible to increase the mounting space of the second circuit board 1242.

In the motor according to the first preferred embodiment of the present invention, the shaft 111 protrudes axially upward from the top end of the rotor holder 112. With this structure, when the motor is mounted to a handy electronic product, a power transmitting member such as a gear or the like can be attached to the tip of the shaft 111. This makes it possible to realize diversification of applications.

The motor according to the second preferred embodiment of the present invention obtains the same effects as those of the motor according to the first preferred embodiment as long as the portions having the same structures as those of the first preferred embodiment are concerned. No description will be made on the duplicate portions.

The motor according to the second preferred embodiment of the present invention preferably is an inner-rotor-type motor. Space saving is realized in the case of an electronic product that uses the inner-rotor-type motor.

As described above, the motor according to various preferred embodiments of the present invention includes two circuit boards and a circuit board support portion. Attachment portions are provided on the outer circumferential surface of the circuit board support portion. The motor is attached to a body of an electronic part by virtue of the attachment portions. Use of this structure makes it possible to increase the mounting space of the circuit board and to realize the space saving.

The respective elements appearing in the preferred embodiments and the modified examples described above may be suitably combined unless a conflict arises.

Motors according to various preferred embodiments of the present invention preferably are applicable to all kinds of electronic products that include a motor installed therein.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor, comprising:
a rotary portion configured to rotate about a center axis extending in an up-down direction; and
a stationary portion configured to support the rotary portion; wherein
the rotary portion includes a shaft extending along the center axis, a rotor holder configured to rotate together with the shaft, and a rotor magnet held in the rotor holder,
the stationary portion includes a bearing member configured to rotatably support the shaft, a housing configured to hold the bearing member, a stator held in the housing and radially opposed to the rotor magnet, a circuit board directly or indirectly held in the housing, positioned axially below the rotor holder and electrically connected to the stator, and a circuit board support portion defined together with the housing as a single monolithic member or directly or indirectly held in the housing, directly or indirectly attached to a device body and configured to axially support the circuit board;
the circuit board includes a first circuit board positioned axially above the circuit board support portion and a second circuit board positioned axially below the circuit board support portion;
the first circuit board and the second circuit board are electrically connected to each other via a connecting member;
the first circuit board and the second circuit board at least partially overlap with each other in an axial direction;
an attachment portion configured to attach the motor to a device is positioned on an outer peripheral surface of the circuit board support portion; and
the attachment portion includes two or more attachment portions distributed along a circumferential direction evenly or substantially evenly, and the attachment portion is provided directly axially between the first circuit board and the second circuit board.

2. The motor of claim 1, wherein the attachment portion includes a recess portion depressed radially inward from the outer peripheral surface of the circuit board support portion.

3. The motor of claim 2, wherein a fixing member is inserted into the attachment portion from a radial outer side such that the motor is fixed to the device body.

4. The motor of claim 1, wherein an electronic part is mounted to an axial lower surface of the second circuit board.

5. The motor of claim 4, wherein the electronic part is a control integrated circuit.

6. The motor of claim 1, wherein a rotation position detecting member is mounted to an axial upper surface of the first circuit board.

7. The motor of claim 1, wherein an electronic part is attached to the circuit board and is disposed in a space between the first circuit board and the second circuit board.

8. The motor of claim 1, wherein the circuit board support portion is made of a resin.

9. The motor of claim 1, wherein the circuit board support portion has a disc shape.

10. The motor of claim 1, wherein the rotor magnet is fixed to an inner circumferential surface of the rotor holder and the stator is opposed to an inner circumferential surface of the rotor magnet.

11. The motor of claim 1, wherein the second circuit board partially overlaps with the shaft in the axial direction.

12. The motor of claim 1, wherein the shaft protrudes axially upward from a top end of the rotor holder.

* * * * *